United States Patent [19]

Sharp

[11] 4,394,066
[45] Jul. 19, 1983

[54] REVERSIBLE FLAG TYPE REAR VIEW MIRROR

[75] Inventor: Bernard C. Sharp, White Plains, N.Y.

[73] Assignee: Parker Hannifin Corporation, Shelton, Conn.

[21] Appl. No.: 200,469

[22] Filed: Oct. 24, 1980

[51] Int. Cl.³ .............................................. B60R 1/06
[52] U.S. Cl. ........................ 350/307; 248/475 R 248/481
[58] Field of Search .............................. 350/288, 307; 248/475 R, 476, 477, 479, 481

[56] References Cited

FOREIGN PATENT DOCUMENTS 2818177 12/1978 Fed. Rep. of Germany ...... 248/477
2839138 3/1980 Fed. Rep. of Germany ...... 350/307
2310677 12/1976 France ........................... 248/475 R Primary Examiner—F. L. Evans
Attorney, Agent, or Firm—Albert C. Johnston

[57] ABSTRACT

A rear view mirror of the "flag" type which is assembleable for use on either the left side or the right side of a vehicle and disposes the mirror relatively close to the driver comprises a mirror head formed by a reversible housing member recessed at one end thereof behind the mirror frame and a U-shaped saddle member fitting in the end recess, with means fixed to the lower leg of the saddle member for joining the head pivotably with a mounting bracket by which the head can be disposed upright when the bracket is attached to a vehicle body surface having any of a variety of slopes relative to the horizontal.

10 Claims, 17 Drawing Figures

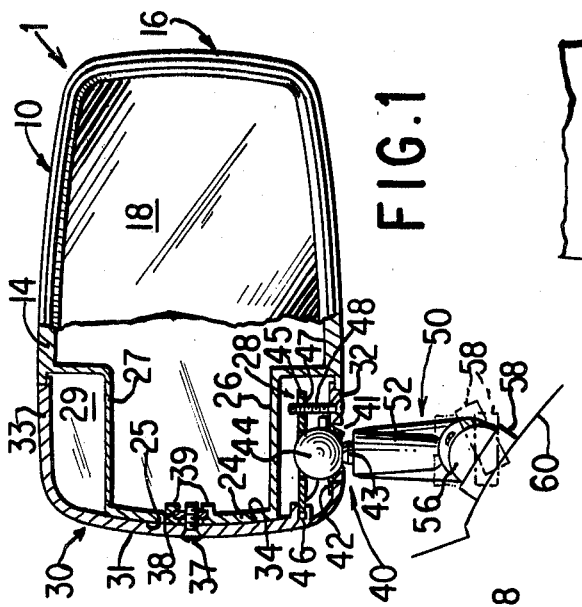
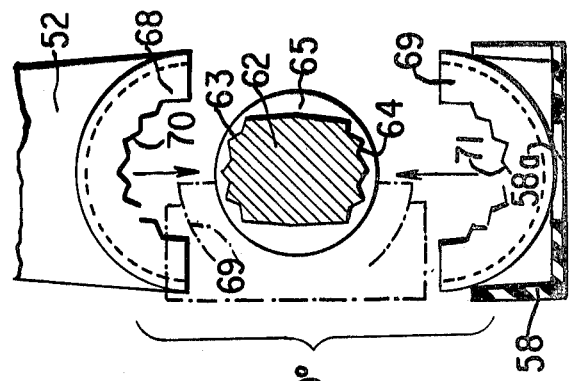
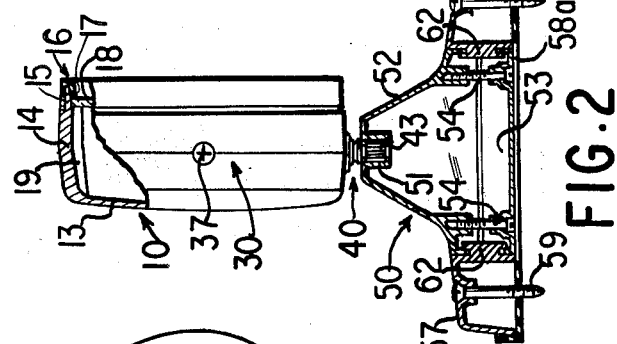
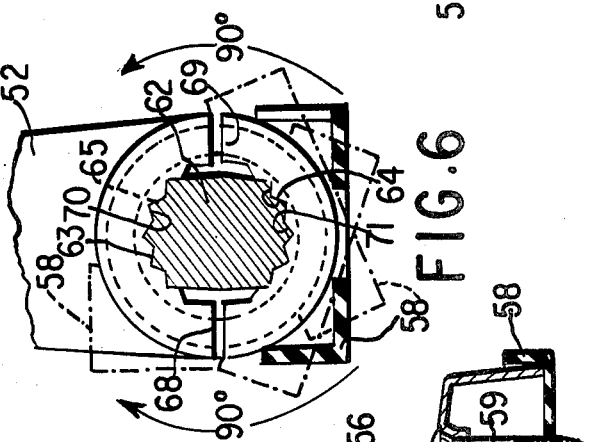
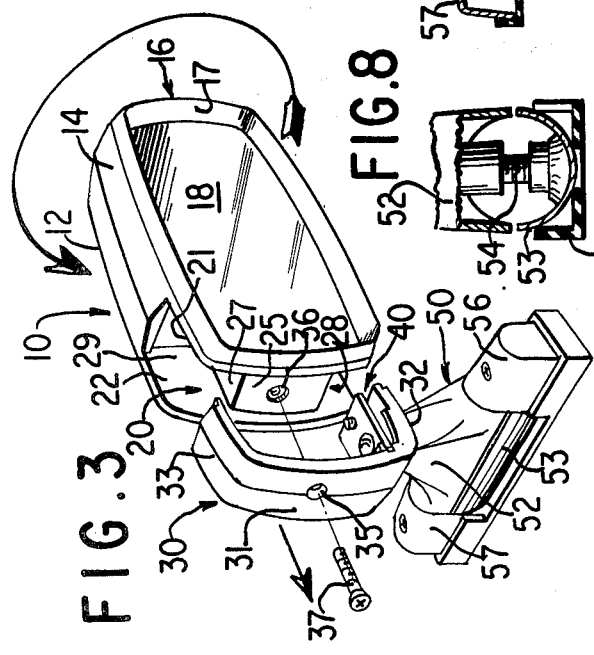
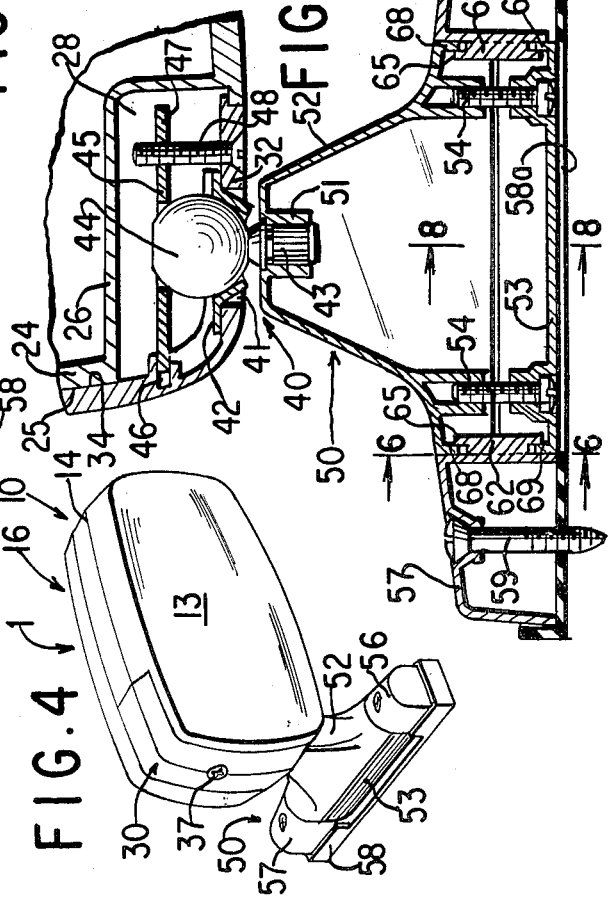

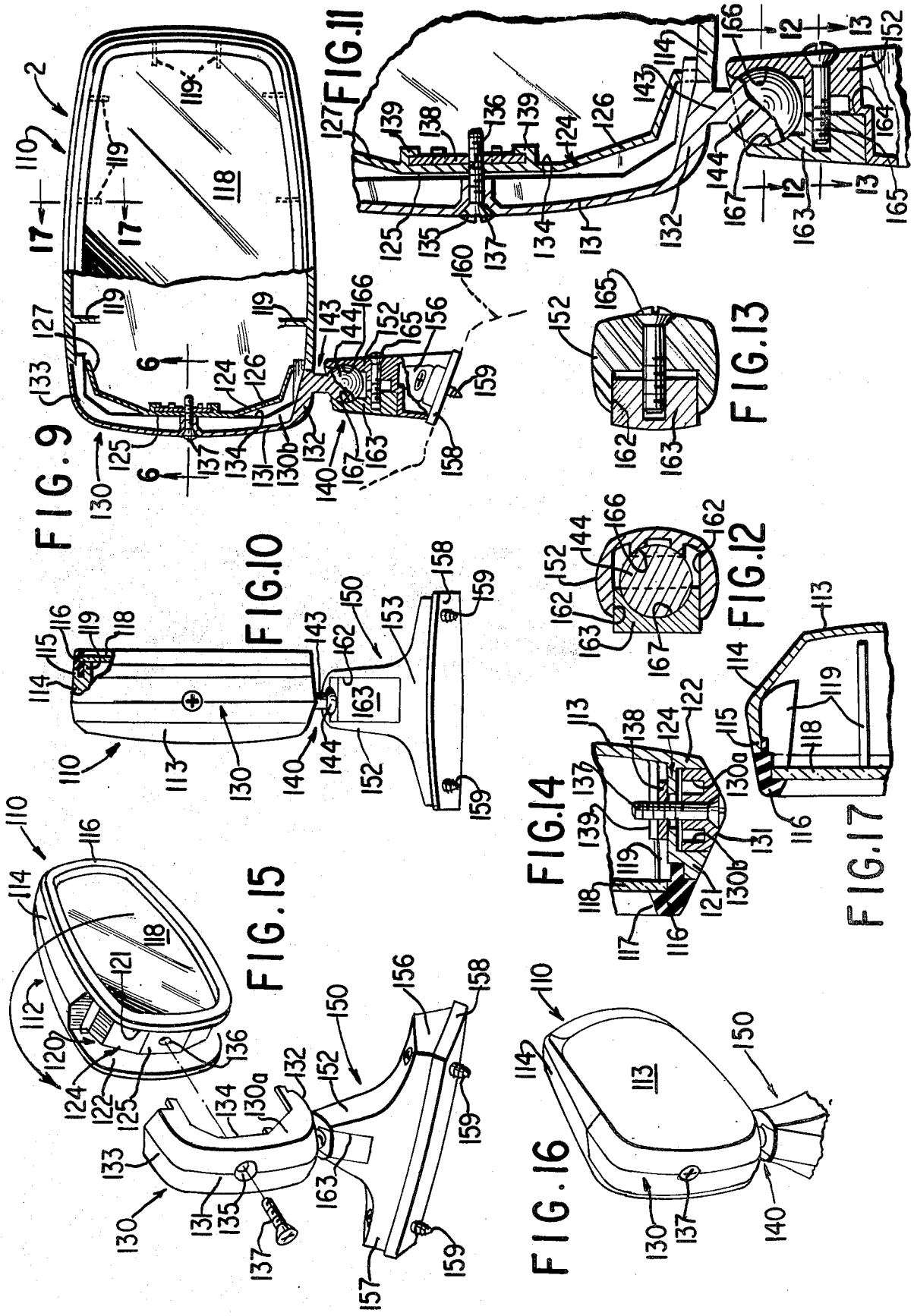

REVERSIBLE FLAG TYPE REAR VIEW MIRROR

This invention relates to rear view mirrors of the so-called "flag" type, which comprise an elongate generally polygonal mirror head supported pivotably near one of its ends. The invention relates more particularly to such a mirror head that can be assembled for use on either the left side or the right side of a vehicle body; also, to combinations of mirror heads of this nature with mirror mounting brackets and to the mounting brackets involved.

Motor vehicles such as automobiles recently have been equipped with "flag" type rear view mirrors as a safety measure. Such a mirror typically comprises an elongate, generally polygonal mirror head connected near one end thereof with a mounting bracket so that when the bracket is attached to a side of a vehicle body, such as to a body door or a fender of an automobile, the head in viewing position will protrude outward from the bracket and may be pivoted inward by an impact or upon engaging an obstruction in its path on the vehicle. Thus, the risk of injury to a person or an object in the path of the mirror head is reduced, as well as the risk of damage to the head or other parts of the mirror assembly.

Rear view mirrors of the "flag" type have been made heretofore in two distinct versions for installation and use on the left side and the right side, respectively, of a vehicle. The two versions require parts that differ in form and assembly. Extensive costs and complications are involved in the production, packaging, storing and distribution of both left side and right side mirrors of a given size or design required for automotive use.

The principal object of the present invention is to provide a mirror head construction and a combination thereof with a mounting bracket which enable the same parts to be assembled into a rear view mirror of the "flag" type for use on either the left side or the right side of a vehicle.

Another object of the invention is to provide such a rear view mirror which has part of the viewing area of the mirror disposed inboard of a swivel joint connecting the mirror head with the mounting bracket, so that the viewing plane can be located relatively close to the body of a vehicle and relatively close to the driver's seat for improved mirror vision.

A further object is to provide a combination of a rear view mirror head with a mirror mounting bracket, and a bracket for mounting a mirror head, which can be fixed directly to a supporting surface, such as a surface of a door or a fender of a vehicle body, having any of various slopes relative to the horizontal yet can be set and held at an angular position adapted to the slope of the supporting surface so that the mirror head will in any case be held in a desired viewing position with its swivel axis substantially upright.

A rear view mirror head according to the invention comprises a housing member of elongate generally polygonal shape forming a frame for a mirror plate and provided with a recess extending about and behind one end of the frame, and a substantially U-shaped saddle member is provided which fits in the recess of the housing member and has means such as a swivel ball joint or a part of such a joint fixed to the saddle member for joining the mirror head pivotably with a mirror mounting bracket to be attached to a side of a vehicle body. The housing member and the saddle member are formed with connecting portions which confront in the recess of the housing member and are joinable for fixing these members together with the housing member facing to either side of the saddle member. Thus, the mirror head is assembleable for use on either the left side or the right side of a vehicle body, and it can be assembled for such use with a mounting bracket that is the same for either position of use.

When the mirror head has been assembled for use on one side of a vehicle, it can be reassembled for use on the other side simply by disengaging a connection between the saddle member and the housing member, separating the housing member and turning it 180° about its longitudinal center line, and then reengaging the housing member in reversed orientation with the saddle member.

Another advantage of the mirror head in either orientation of the housing member is that the means for joining the head pivotably with a mounting bracket can be fixed to the lower leg of the saddle member at a location outboard of the end of the housing member straddled by the saddle member, i.e., with the mirror plate framed by the housing member located somewhat inboard of the swivel joint, so that a rear view mirror assembly of the "flag" type can be obtained in which the mirror head is relatively close to the vehicle body and its viewing area is relatively close to the driver's seat.

According to a preferred embodiment of the invention, the saddle member has a swivel ball clamped inside its lower leg with a support post fixed to and protruding downward from the ball for connection with a mirror mounting bracket, and the housing member is formed, inside the recess that receives the saddle member, with oppositely disposed pockets which are located opposite the upper and lower legs respectively of the saddle member so that the swivel ball is housed in one or the other of the two pockets when the housing member is fixed in either of its mirror facing positions. A mounting bracket especially advantageous for holding a mirror head of this construction and attaching it to either side of a vehicle body, comprises an arm portion having the support post of the swivel ball fixed thereto, a base portion to be fixed to the vehicle body and coacting means respectively on the base portion and the arm portion for setting and holding the arm portion immovably at any desired one of a plurality of angular positions relative to the base portion.

According to another embodiment of the invention, the saddle member of the mirror head has a mirror support post fixed to and extending downward from its lower leg with a swivel ball fixed to the lower end of the support post for connection with a mirror mounting bracket. A mounting bracket for holding a mirror head of this construction and attaching it to either side of a vehicle body comprises a base portion to be fixed to the vehicle body, a part fixed to and protruding upward from the base portion and formed with a laterally facing socket to receive a side portion of the swivel ball, a displaceable part arranged opposite the fixed part and formed with a socket to engage an opposite side portion of the ball and means for contracting these parts against the ball engaged in the sockets so as to clamp the ball between the parts.

The above-mentioned and other objects, features and advantages of the invention will be further apparent from the following detailed description and the accompanying drawings of illustrative embodiments of the invention. In the drawings:

FIG. 1 is a front elevational view, partly in section, of a rear view mirror according to a preferred embodiment of the invention;

FIG. 2 is a rear end elevational view thereof showing the mirror mounting bracket in longitudinal cross section and the mirror head partly in transverse cross section;

FIG. 3 is a perspective view thereof showing the housing member of the mirror head detached from the saddle member in readiness for being turned from a right side viewing position to a left side viewing position;

FIG. 4 is a perspective view of the rear view mirror as reassembled for use on the left side of a vehicle;

FIG. 5 is a longitudinal cross sectional view of the mirror mounting bracket and the swivel joint connection of the mirror head;

FIG. 6 is a cross sectional view of parts of the mounting bracket, taken along line 6—6 of FIG. 5;

FIG. 7 is a view similar to that of FIG. 6 but with the parts separated from one another;

FIG. 8 is a fragmentary sectional view taken along line 8—8 of FIG. 5;

FIG. 9 is a front elevational view of another form of a rear view mirror embodying the invention;

FIG. 10 is a rear end elevational view thereof, partly in section;

FIG. 11 is an enlarged cross sectional view of part of the structure of FIG. 9;

FIG. 12 is a cross sectional view of the swivel joint, taken along line 12—12 of FIG. 11;

FIG. 13 is a cross sectional view of parts of the mounting bracket, taken along line 13—13 of FIG. 11;

FIG. 14 is a transverse cross sectional view of parts of the mirror head, taken along line 14—14 of FIG. 9;

FIG. 15 is a perspective view of the rear view mirror of FIG. 9 showing the mirror housing member detached from the saddle member in readiness for being turned from right side to left side viewing position;

FIG. 16 is a perspective view thereof with the mirror head reassembled for use of the mirror on the left side of a vehicle; and FIG. 17 is a fragmentary cross sectional view of parts of the mirror housing member, taken along line 17—17 of FIG. 9.

The rear view mirror shown in FIGS. 1-8 is an assembly of the "flag" type which includes a mirror head 1 connected near one of its ends through a swivel joint 40 with a mounting bracket 50, and which can be assembled easily for installation and use on either the left side or the right side of a motor vehicle. Typically the rear view mirror will be mounted on the outer side of a body door at the driver's seat of the vehicle with the reflecting mirror plate of the head located suitably ahead of and below a driver's eye level to provide a view alongside and to the rear of the vehicle.

The mirror head 1 as shown comprises a somewhat elongate housing member 10 of generally polygonal shape and a saddle member 30 which in this embodiment has the principal parts of the swivel joint 40 fixed to it for joining the head pivotably with the mirror mounting bracket 50.

The housing member 10 comprises a boxlike housing body 12 that preferably is made as a unitary molding of a suitable plastic composition, for instance, a polycarbonate resin impregnated with carbon black, and presents a back wall 13, a peripheral side wall 14 and a rim 15 extending entirely about the front side of the housing body. The rim 15 is formed to fit into the hold securely a mirror frame element 16 of U-shaped cross section with the inner wall 17 of this frame element bearing against the margin of a reflecting mirror plate 18. The plate 18 is seated on supporting ribs 19 provided at suitable locations about the inner side of the rim 15. The side wall 14 with its rim 15 and ribs 19 and the fitting frame element 16 thus constitute a frame for the mirror plate 18 which covers substantially the entire area of the front side of the housing member.

As shown in FIG. 3, the body 12 of the housing member is provided at one end thereof with a recess 20 which extends about and behind one end of the mirror frame between a front rim end portion 21 and a back wall end portion 22 of the housing body. A central inner end portion 24 of the housing body side wall presents an end surface 25 bordering the inner side of the recess 20. This inner end portion is joined with the side wall 14 by partitions 26 and 27 which are spaced inward from the rim end portion 21 and form inside the recess 20 pockets 28 and 29 disposed symmetrically at the lower and upper sides respectively of the recessed end of the housing member.

The saddle member 30 comprises a substantially U-shaped structure which fits into the recess 20 of the housing member 10 to form a closed mirror head 1 having a smooth outside contour, as indicated in FIGS. 1, 2 and 4. The saddle member comprises a body providing a central base portion 31 and lower and upper legs 32 and 33, all formed to fit into and close the recess 20 between the substantially parallel front rim end portion 21 and back wall end portion 22 of the housing member. The base portion 31 of the saddle member has a centrally disposed inner surface 34 that mates with and supports the end surface 25 of housing end portion 24. The mating surfaces 25 and 34 and the meeting edge surfaces of the saddle member and the housing member are formed symmetrically relative to the longitudinal center line of the housing member. Also formed symmetrically relative thereto are openings 35 and 36 in the base portion 31 and the end portion 24, which openings receive suitable means such as a screw 37 for joining the housing member and the saddle member together. The screw 37 as shown fits through the openings 35 and 36 and engages with a threaded nut 38 held in a socket formed by flanges 39 at the inner side of the housing end portion 24.

The swivel joint 40 in the embodiment shown is fixed inside the lower leg 32 of the housing member and, in the mirror head as it is shown assembled in FIGS. 1 and 5, is housed in the pocket 28 of the housing body beneath partition 26 thereof. Saddle leg 32 is formed with an opening 41 having a concave washer 42 seated in it. A mirror support post 43 protrudes downward through the washer from a swivel ball 44 seated on the washer. The swivel ball 44 is clamped in place by a clamping plate 45 having an opening fitted over the top of the ball. One end of the plate 45 is engaged in a recess 46 inside the saddle member and its other end 47 has a screw threaded opening which receives a fastening screw 48 inserted through an opening in the saddle leg 32.

By tightening the screw 48, the clamping plate can be pressed and held against the swivel ball 44 with a force sufficient to hold the saddle member 30 and the housing member assembled with it in a desired set position relative to the axis of the support post 43 and ball 44 under normal conditions of use of the mirror, yet to permit adjustment or resetting of the mirror head position as and whenever desired. It will also be apparent that the assembled mirror head 1 protrudes away from the supporting ball and post located near its inner end so that an obstruction in the path of the head or an impact against it, in either forward or backward direction, can readily turn the head about the swivel ball to avoid or to minimize injury.

The mirror support post 43 is fixed in a socket 51 formed centrally in an upstanding arm portion 52 of the mirror mounting bracket 50. The arm portion 52 is formed as a hollow body closed at its lower or inner side by an arm cap 53 fastened to the body by screws 54. The arm body and cap are joined with a base portion of the mounting bracket, which comprises end members or caps 56 and 57 spaced apart at opposite ends of the arm portion and seated on a mounting pad 58. The end members 56 and 57 and mounting pad 58 can be fastened to a side surface of a vehicle body, such as an outside body door surface indicated at 60 in FIG. 1, by suitable fasteners such as screws 59 passed through openings in the end members 56 and 57.

The arm portion 52, 53 and the base portion 56, 57 of the mounting bracket are provided with coacting means for joining them together with the arm portion set and held immovably at any desired one of a plurality of angular positions relative to the base portion, thus enabling the mirror head 1 to be disposed with the axis of the support post 43 substantially upright when the mounting bracket is mounted on a vehicle body surface 60 having any of a variety of slopes relative to the horizontal. Several of the body surface slopes to which the bracket can be mounted with the support axis of the mirror head disposed upright are indicated by broken outlines of the mounting pad 58 in FIGS. 1 and 6.

As shown in FIGS. 2, 5, 6 and 7, each of the end members 56 and 57 of the base portion is formed with a protruding knob 62 having upper and lower peripherally toothed areas 63 and 64 bordered by an end flange 65. The opposite ends of the arm portion 52 and of its cap 53 are formed with flanges 68 and 69, respectively, each of which is centrally recessed and toothed along the recessed edge, for instance as shown at 70 and 71 in FIGS. 6 and 7, thus providing toothed sockets that will mate with the teeth of the toothed knob areas 63 and 64.

When the arm portion 52 and its cap 53 are assembled, their end flanges 68 and 69 are fitted inside the knob flanges 65 and are drawn together by the fastening screws 54, with the arm portion 52 and the mirror head disposed in a desired angular relation to the base end members 56 and 57, so as to clamp the toothed sockets 70 and 71 against the fitting toothed portions 63 and 64 of the knobs 62. When a change of the angular relationship is required in order to adapt the mirror for mounting on a body surface having a different slope, the screw fasteners 54 can be loosened or disengaged, their heads being accessible through a central opening 58a formed in the mounting pad 58. The base portion can then be turned relative to the arm portion to provide the required angular relationship, whereupon the fasteners 54 are reengaged to clamp the toothed sockets upon the toothed knobs in the newly adjusted position of the base portion relative to the arm portion 52 and the mirror head 1.

The principal parts of the mounting bracket, namely, the arm portion 52, its cap 53, and the end members 56 and 57, can be made of any suitably strong and weather-resistent metal or plastic composition. The same applies to the U-shaped saddle member 30 of the mirror head. Preferably, each of these parts is made as a unitary casting, such as a die casting, of a suitable metal such as the zinc alloy known as Zamak #3.

The rear view mirror assembly as it is shown in FIG. 1 has the mirror head 1 protruding to the right with the mirror plate 18 facing backward from the mounting bracket 50, so is suited for installation and use on the right side of a vehicle body. The same rear view mirror structure can easily be adapted for installation and use on the left side of a vehicle body, merely by removing the screw 37 from the housing member 10 of the mirror head, separating the housing member from the saddle member 30 as indicated in FIG. 3, and then turning the housing member 180° about its longitudinal center line, reengaging it in the saddle member and re-fastening it in place by the screw. The swivel ball 44 and related parts of the joint 40 on the lower leg 32 then are housed in the pocket 29 of the housing member, with the back wall 13 of the housing member facing backward as shown in FIG. 4.

FIGS. 9-17 of the drawings show a rear view mirror that embodies the invention in an arrangement and structures which in some respects are simpler than those of the embodiment of FIGS. 1-8. The mirror comprises a mirror head 2 of elongate generally polygonal shape connected through a swivel joint at 140 with a mounting bracket 150. The mirror head 2 is composed of a housing member 110 coupled with a substantially U-shaped saddle member 130 which in this embodiment has a mirror support post 143 fixed to and protruding downward from its lower leg with a swivel ball 144 fixed on the lower end of the support post and clamped in the mounting bracket 150.

The housing member 110 comprises a boxlike body 112 which, again, preferably is a unitary molding of a suitable plastic composition such as a polycarbonate resin impregnated with carbon black. The body 112 has a back wall 113, a peripheral side wall 114 and a front rim 115 extending entirely about the front side of the mirror head. The rim 115 is formed with a channel which receives and holds securely the base of a mirror frame element 116 of elastomeric material with a flange 117 of this frame element bearing against the margin of a reflecting mirror plate 118. The mirror plate 118 is seated on supporting ribs 119 provided at suitable locations about the inner side of the rim 115. The side wall 114 with its rim 115 and ribs 118 and the fitting frame element 116 thus constitute a frame for the mirror plate 118 which covers substantially the entire area of the front side of the housing member.

As shown in FIG. 15, the body 112 of the housing member is provided at one end thereof with a recess 120 extending about and behind one end of the mirror frame between a front rim end portion 121 and a back wall end portion 122 of the housing body. A central inner end portion 124 of the housing body side wall presents an end surface 125 bordering the inner side of the recess 120. This inner end portion is joined with the side wall 114 by partitions 126 and 127 spaced somewhat inward from the end portion 124.

The saddle member 130 comprises a substantially U-shaped structure that fits into the recess 120 of the housing member 110 to form a closed mirror head 2 having a smooth outside contour as seen in FIGS. 9, 10 and 16. The saddle member comprises a body providing a central base portion 131 and lower and upper legs 132 and 133, all formed to fit into and close the recess 120 between the substantially parallel front rim end portion 121 and back wall end portion 122 of the housing member. Side walls 130a and 130b of the saddle member present a centrally disposed inner surface 134 that mates with and supports the end surface 125 of housing end portion 124.

The mating central surfaces 125 and 134 and the meeting edge surfaces of the saddle member and the housing member are formed symmetrically relative to the longitudinal center line of the housing member. Also formed symmetrically relative thereto are openings 135 and 136 in the base portion 131 and the end portion 124, which openings receive suitable means such as a screw 137 for joining the housing member and the saddle member together. The screw 137 as shown fits through the openings 135 and 136 and engages with a threaded nut 138 held in a socket formed by flanges 139 at the inner side of the housing end portion 124.

The swivel ball 144 on the mirror support post 143 in the embodiment shown fits and is fixed in place between relatively displaceable parts of an upstanding arm portion 152 of the mirror mounting bracket 150. The arm portion 152 protrudes upward from a widened base portion 153 of the bracket which is seated in a mounting pad 158 and has relatively shallow opposite ends 156 and 157 each formed with an opening at its top through which a fasterner, for instance, a screw 159, can be inserted to be screwed through the underlying mounting pad and into a vehicle body structure, such as a body door surface indicated at 160 in FIG. 9, for mounting the rear view mirror in a position for use.

The arm portion 152 of the mounting bracket has a latterally open cavity 162 formed in its inner side. This cavity has a displaceable part 163 fitted into it so as to bear upon the floor of the cavity with a lower portion of part 163 butting against a shoulder 164 at the lower and inner side of the cavity. Part 163 has a screw-threaded bore formed in a mid portion of this part to receive a screw 165 passed through an opening in the relatively fixed part 152. At a location above the screw 165, part 152 is formed with a spherically curved socket 166 to engage a side portion of the swivel ball 144, and part 163 is formed with a similarly curved socket 167 to engage an opposite side portion of the swivel ball. The sockets 166 and 167 are spaced apart sufficiently at their upper side so that when the ball is engaged and clamped in the sockets the axis of the mirror support post 143 can be disposed upright even though at any of a considerable variety of angular positions relative to the mounting bracket 150, so to a door or other body surface to which the bracket is attached. The ball 144 is clamped in the sockets simply by tightening the screw 165.

When the arm portion 152 and its displaceable part 163 are assembled, the swivel ball 144 is placed between them in the sockets and part 163 is drawn toward part 152 by the fastening screw 165 to clamp the ball with the support post 143 and the mirror head 2 disposed upright in the desired viewing position and the mounting bracket 150 turned to the angular position required for fastening it through its mounting pad 158 to the vehicle body surface to which the mirror is to be mounted for use. When a change of the angular relationship is required in order to adapt the mirror for mounting on a body surface having a different slope, the mirror head can be turned relative to the mounting bracket against the friction imposed by the sockets 166 and 167 against the ball 144, or if desired the screw 165 can be loosened to ease turning of the head and then retightened. It will also be apparent that the assembled mirror head 2 in viewing position protrudes laterally from the supporting post and swivel ball, which are located near its inner end, so that an obstruction in the path of the mirror head or an impact against it can readily turn the head in either forward or backward direction about the swivel center of the ball to avoid or to minimize injury.

The U-shaped saddle member 130 of the mirror head preferably is formed as a unitary part with the support post 143 and the swivel ball 144. The arm portion 152 and base portion 153 of the mounting bracket are also preferably formed as one part, the displaceable part 163 of course being another part. Each of these parts can be made of any suitably strong and weather-resistent metal or plastic composition. Again, each of them preferably is made as a unitary casting, such as a die casting, of a suitable metal such as the zinc alloy known as Zamak #3.

The rear view mirror assembly as it is shown in FIG. 9 has the mirror head 2 protruding to the right with the mirror plate 118 facing backward from the mounting bracket 150, so is suited for installation and use on the right side of a vehicle body. The same rear view mirror structure can easily be adapted for installation and use on the left side of a vehicle body, merely by removing the screw 137 from the housing member 110 of the mirror head, separating the housing member from the saddle member 130 as indicated in FIG. 15, and then turning the housing member 180° about its longitudinal center line, reengaging it in the saddle member and re-fastening it in place by the screw. The swivel ball 144 and the support post 143 on the lower leg 132 of the housing member continue to be held in place by parts 162 and 163 of the mounting bracket 150, though adjustably so due to the ball 144 being turnable with the mirror head against the friction of the ball clamping sockets.

It will be understood that the new features and relationships of the invention herein disclosed are not restricted to the particular forms of embodiment illustrated in the drawings and described in detail hereinabove but may be embodied in various other forms and arrangements of structures while still utilizing the present invention which is intended to be defined by the appended claims.

I claim:

1. A rear view mirror head comprising a housing member of elongate generally polygonal shape, said member forming a frame for a mirror plate and being provided with a recess extending about and behind one end of said frame, and a substantially U-shaped saddle member fitting in said recess, said saddle member having means fixed thereto for joining said head pivotably with a mirror mounting bracket to be attached to a side of a vehicle body, said housing member and said saddle member respectively having connecting portions which confront in said recess and are joinable for fixing said members together with said housing member facing to either side of said saddle member so that the mirror head is assembleable for use on either the left side or the right side of a vehicle body.

2. A mirror head according to claim 1, said recess lying between substantially parallel front and rear wall portions of said housing member and being bordered by a central end portion thereof, said end portion and a midportion of said saddle member having mating surfaces provided with means symmetrical to their longitudinal center line for joining said members together with the housing member disposed in either of its mirror facing positions.

3. A mirror head according to claim 1 or 2, said saddle member having a swivel ball clamped inside its lower leg with a mirror support fixed to and protruding downward from said ball for connection with a mirror mounting bracket, said housing member forming inside said recess oppositely disposed pockets in one or the other of which said swivel ball is housed when said housing member is fixed in either of its mirror facing positions.

4. A mirror head according to claim 1 or 2, said saddle member having a mirror support post fixed to and extending downward from its lower leg with a swivel ball fixed to the lower end of said post for connection with a mirror mounting bracket.

5. A rear view mirror comprising a mirror head according to claim 3 and a mounting bracket for holding said head and attaching it to a side of a vehicle body, said bracket comprising an arm portion having said support fixed thereto, a base portion to be fixed to the vehicle body, and coacting means respectively on said base portion and said arm portion for setting and holding the arm portion immovably at any desired one of a plurality of angular positions relative to the base portion.

6. A rear view mirror according to claim 5, said coacting means comprising a peripherally toothed knob on said base portion, and on said arm portion a toothed socket mating with and clampable at any one of a plurality of angular positions upon the teeth of said knob.

7. A rear view mirror according to claim 5, said base portion comprising end members spaced apart and formed to receive fasteners for attaching them to the vehicle body, the confronting ends of said end members each having a peripherally toothed knob thereon, said arm portion being disposed between said end members and comprising an arm body formed centrally with means to retain said support post and an arm cap to be fastened to said arm body over its inner side, said arm cap and said arm body having respective end portions thereof formed as oppositely facing toothed sockets which mate with teeth of the knobs on said end members and, upon said cap being fastened to said arm body, are clamped against said teeth so as to hold said arm portion in a certain angular position relative to said base portion.

8. A rear view mirror according to claim 7, said base portion further comprising a mounting pad to bear against a surface of the vehicle body and forming a seat for said end members, said pad having a central opening therein through which said arm cap is accessible for unfastening it from said arm body so as to release said toothed sockets and thus enable resetting of said arm portion to a desired angular position.

9. A rear view mirror comprising a mirror head according to claim 4 and a mounting bracket for holding said head and attaching it to a side of a vehicle body, said bracket comprising a base portion to be fixed to the vehicle body, a part fixed to and protruding upward from said base portion and formed with a laterally facing socket to receive a side portion of said swivel ball, a displaceable part arranged opposite said fixed part and formed with a socket to engage an opposite side portion of said swivel ball, and means for contracting said parts against said ball engaged in said sockets so as to clamp the ball between said parts.

10. A rear view mirror according to claim 9, said fixed part comprising a laterally open cavity having said displaceable part fitted thereinto and presenting at the lower and inner side of said cavity a shoulder abutted by a lower portion of said displaceable part.

* * * * *